UNITED STATES PATENT OFFICE 2,163,282

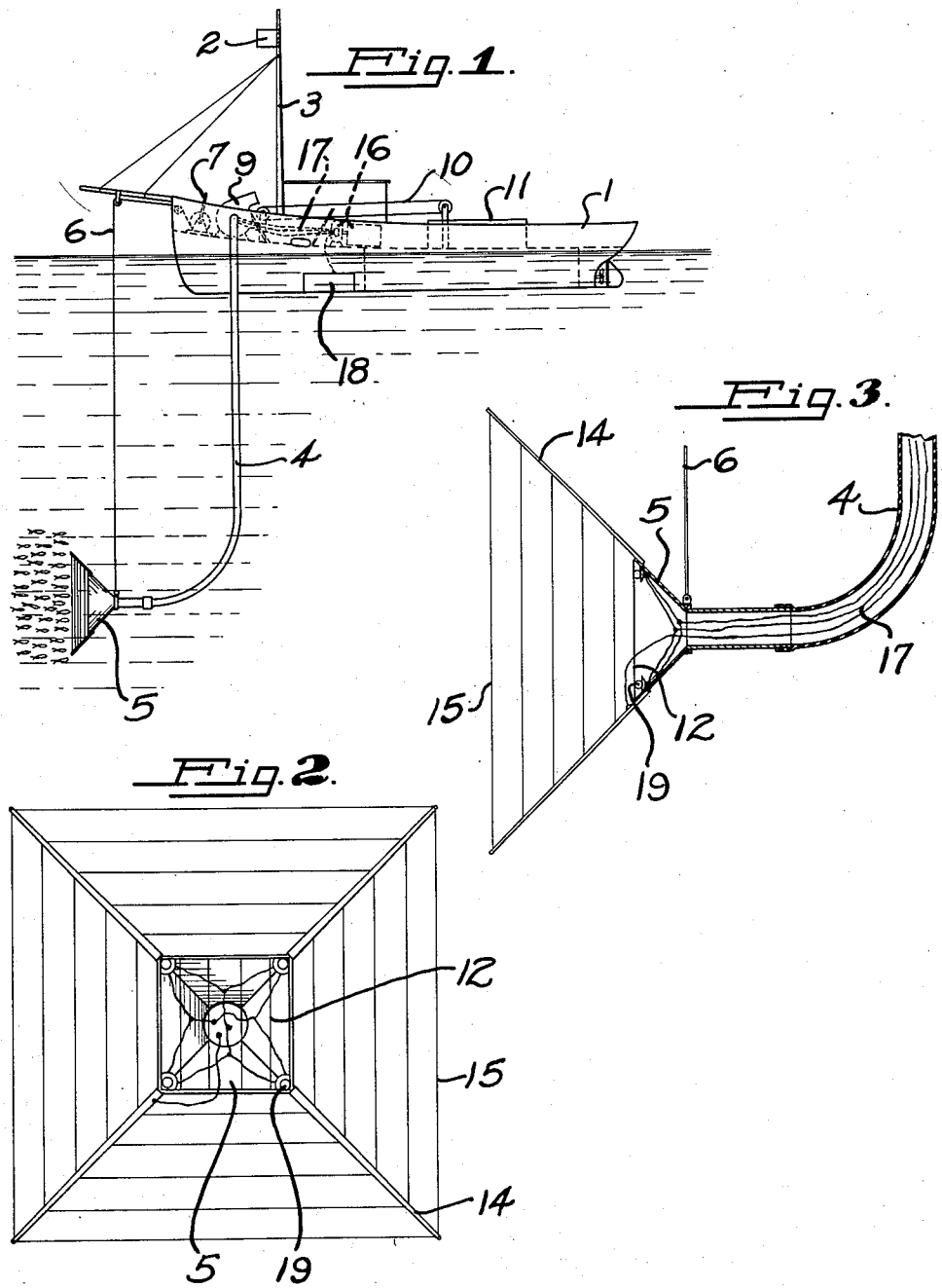

MEANS FOR CATCHING FISH

Knut Hovden, Monterey, Calif.

Application March 10, 1937, Serial No. 130,061

3 Claims. (Cl. 43—4)

My invention relates to a means for catching fish, and more particularly to a hydraulic system whereby the fish are transported from the water onto a fishing boat after being electrically disabled.

Among the objects of my invention are: To provide a means and method of catching fish in large quantities from schools; to provide a means and method of locating and catching fish; to provide a means and method of disabling fish so that they may be hydraulically collected; and to provide a means and method of bringing fish within the sphere of influence of a pump intake.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawing, Figure 1 is a diagrammatic view of a vessel equipped to practice my invention.

Figure 2 is a front view in elevation of the hydraulic intake.

Figure 3 is a sectional view of the hydraulic intake.

I am well aware that it has been suggested before to pump fish from schools aboard a vessel by placing an intake below the water line, and then progressing the vessel through a school of fish in the hope that some of the fish will enter the intake to a point where they may be caught in the suction applied by a pump and transported onto the deck of the vessel. Such a hydraulic Rubach patent, No. 1,606,668, issued November 9, 1926. However, such boats, or those operating on the same general principle, have not proved successful commercially, and I have found by experimentation that the reason for this lack of commercial success is that the fish shy away from the entrance to the hydraulic conduit and very seldom enter to a point where they can be collected by the motion of the water passing through the conduit. I have also experimentally determined that this is due in the main to the fact that fish in general, and particularly when swimming in schools, have a minimum approach distance to any object which is readily visible in the water. Thus there is a zone around the end of a hydraulic conduit into which the fish will not enter, probably because they can see the approaching funnel. By direct observation I have found that when such a funnel is progressing through the water, and through a school of fish, the school will divide, maintain a minimum distance between the funnel and themselves, and pass by. Therefore only an occasional fish will be collected. The zone of approach may vary with different kinds of fish, but I have found it to be a universal characteristic, at least with such fish as herring, sardines, pilchards, anchovies, or similar fish which congregate in schools.

I have, however, found that if fish of these or similar species are subjected to an electric field their faculties are so changed that they do not maintain their normal minimum approach distance, and therefore may be readily collected. I have also found that it is possible to charge the water ahead of a hydraulic conduit entrance with charging means of such small physical dimensions that the fish do not readily see it and pass within the sphere of influence of the electrical field, thereafter being easily collected due to the disabling or stunning action of the current.

Inasmuch as I have not been able to definitely determine just what the action of this electrical field is upon the faculties of the fish, I have herein utilized the term "disabled" or "stunned", meaning broadly, that the fish, when entering the electric field, have been affected in such a manner that the minimum approach distance is not maintained, and that they do not shy away from the visible body representing the entrance to a hydraulic conduit placed beneath the surface of the water. Whether the fish are actually paralyzed or not, I do not know, but I have proved by observation that if subjected to an electric charge of sufficient intensity they can be readily approached and collected by hydraulic means.

Broadly therefore, my method comprises applying an electric charge to fish (preferably in schools), of such an intensity that they may be readily collected by hydraulic means.

Broadly, as to means, my invention comprises a hydraulic suction system having an intake below the surface of the water and an outlet on a fishing vessel, together with an electrode extending ahead of the intake in such a manner as to be relatively invisible to the fish, and means for exciting the electrode to create an electric charge at a point beyond the normal minimum approach distance of the fish to the intake, whereby the fish are in some manner sufficiently incapacitated to be readily collected by the intake, sucked through the conduit, and discharged on the vessel.

One form of my invention is shown in the drawing, to which direct reference will now be made.

A fishing vessel 1 is provided with a crow's nest, or observation point 2, mounted on a mast 3. A hydraulic conduit 4, having a funnel intake 5, passes into the water, the intake end being supported by an intake cable 6 operated by a winch 7. The hydraulic conduit 4 may be sufficiently flexible so that the intake may be raised or lowered in accordance with the desired fishing depth and the position of the fish beneath the water. The outlet end of the conduit is connected to a pump 9, preferably centrifugal, and discharges on a conveyor 10 on which the discharge water is eliminated. The fish are carried by the conveyor to a storage bin 11.

The funnel 5 at the intake end of the conduit may be solid or of net of sufficiently small mesh so that fish of the type desired may not pass therethrough. The mouth of the funnel is also preferably closed with intake wires 12 to prevent large fish from entering the conduit and plugging it.

From several points on the rim of the funnel 5, I prefer to extend outwardly electrode rods 14, and in some cases to mount upon these rods electrode wires 15 relatively widely spaced and of small section. It is neither necessary nor desirable to have the electrode rods 14 and wires 15 formed in such a manner that they are the equivalent of a net, because such a close spacing of the wires and rods would be immediately visible to the fish. The object is simply to charge a volume of water ahead of the intake opening with an electrode structure such that this water will be charged without showing a sufficient physical area to be readily seen by the fish. Thus the fish will have no hesitation in swimming into the area ahead of the funnel, but will not shy away from the electrode structure because they cannot see it. I also prefer to extend the electrode structure a sufficient distance away from the funnel so that the fish will not attempt to avoid the funnel until they are well within the field created by the electrode structure.

The electrode structure is charged by being made a terminal of an electrical circuit comprising the electrode structure just described, and a generator 16, one pole of which is connected to the funnel by means of waterproof wires 17. However, I do not wish to be limited in any manner to the use of a specific connection, as the wires may be, if desired, run in the lumen of the hydraulic conduit, as shown, may be made as a part of the wall of this conduit, or a separate cable. The other pole of generator 16 is connected to a counter electrode 18, preferably mounted on the bottom of the vessel, the return for the circuit being through the water between the funnel electrode and the counter electrode 18.

In operation the intake is lowered into the water and the boat cruises slowly in search of a school. If the school is on the surface there is no difficulty for an observer in the crow's nest 2 to find it. However, if a school is below the surface it is more difficult, and I have therefore found it to be of great advantage to mount within the funnel, (and utilizing the funnel, or portions thereof, as a reflector), high power electric lamps 19 positioned in any convenient manner so that the light therefrom may be directed ahead of the funnel. This light serves to help the observer find deep swimming schools, and in addition, aids in attracting the fish toward the intake.

After a school has been located the course of the vessel is set to progress through the school and the electric current is turned into the intake electrode. Fish readily enter the region charged by the intake electrodes 14 and 15 and are stunned or otherwise rendered incapacitated to the extent that they do not try to avoid the intake funnel, and are therefore carried up by the suction and discharged on the deck of the vessel. It is only necessary for the electrical charge to temporarily incapacitate the fish or arrest them in the vicinity of the intake a sufficient time for them to actually enter the intake funnel. Once they are in the funnel the velocity of the water is such that they cannot escape, and as they quickly pass out of the charged area at the intake they may be discharged on deck in full possession of their faculties.

I have therefore devised a method of catching fish utilizing hydraulic means whereby large numbers of fish can be caught by momentarily electrically stunning the fish as they approach the hydraulic intake. The applied electrical charge appears in no way to permanently harm the fish, and I have also found that a centrifugal pump may be used without harming the fish. They are discharged alive on board the boat, and may be handled in the same manner as fish caught with nets. There is a great advantage in hydraulic fishing of this type in that large amounts of fish may be obtained with a minimum of labor. I have also found that fish may be caught easier, utilizing my invention, even than with nets, inasmuch as when nets are being set large numbers of fish shy away from the net itself, while they are being encompassed.

It is to be understood that the illustration given herein is purely illustrative of one form of apparatus which may be used to practice my method, and that the invention includes all modifications and equivalents which fall within the scope of the appended claims.

I claim:

1. In combination, a vessel, a conduit extending from said vessel and terminating in the water and discharging on said vessel, means for creating a water flow in said conduit toward said vessel, said conduit terminating in an enlarged portion, conductive rods extending from said enlarged portion and surrounding the conduit entrance, moving said collector through a school of fish, and means for electrically charging said rods.

2. In combination, a vessel, a conduit extending from said vessel and terminating in the water and discharging on said vessel, means for creating a water flow in said conduit toward said vessel, said conduit terminating in an enlarged portion, a conductive network attached to and extending beyond the enlarged portion, and means for electrically charging said entire network to the same polarity.

3. In combination, a vessel, a conduit extending from said vessel and terminating in the water and discharging on said vessel, means for creating a water flow in said conduit toward said vessel, electrode means adjacent the under water terminal of said conduit and means for supplying all of said electrodes with electricity at the same polarity, said electrode means being of small physical area and extending beyond the end of the enlarged portion a distance greater than the average minimum distance fish will approach said enlarged portion.

KNUT HOVDEN.